US00RE50337E

(19) United States
(12) Reissued Patent
Crown et al.

(10) Patent Number: US RE50,337 E
(45) Date of Reissued Patent: Mar. 18, 2025

(54) HYDRAULIC LEVERAGED OVERHEAD DOOR ASSEMBLY

(71) Applicant: CROWN DOORS LLC, Cedar Rapids, IA (US)

(72) Inventors: David A Crown, Waconia, MN (US); Phillip A Crown, Lester Prairie, MN (US)

(21) Appl. No.: 17/576,925

(22) Filed: Jan. 15, 2022

Related U.S. Patent Documents

Reissue of:
(64) Patent No.: 8,714,229
Issued: May 6, 2014
Appl. No.: 13/484,802
Filed: May 31, 2012

(51) Int. Cl.
*E06B 3/48* (2006.01)
*E05D 15/26* (2006.01)
*E05F 15/51* (2015.01)

(52) U.S. Cl.
CPC ..... *E06B 3/483* (2013.01); *E05D 15/262* (2013.01); *E05F 15/51* (2015.01); *E05Y 2900/106* (2013.01)

(58) Field of Classification Search
CPC ..... E05D 15/26; E05D 15/262; E05D 15/264; E05F 15/50; E05F 15/51; E05Y 2900/106; E05Y 2900/108; E06B 3/48; E06B 3/481; E06B 3/482; E06B 3/483; E06B 3/485
USPC ..... 160/201, 203, 207, 213
See application file for complete search history.

(56) References Cited

U.S. PATENT DOCUMENTS 2,113,291 A * 4/1938 Clark et al. ..... 160/189
2,260,080 A 10/1941 Lane
2,854,707 A 10/1958 Hieatt
3,107,722 A 10/1963 Larsson
3,183,873 A 5/1965 Hamilton
3,238,995 A 3/1966 Bonzer
3,464,161 A * 9/1969 Jonsson ..... 49/197
3,484,992 A 12/1969 Blumenthal
3,614,974 A 10/1971 Tajima
3,698,464 A * 10/1972 Scheitel ..... 160/188
4,124,055 A * 11/1978 Aspenson et al. ..... 160/193
4,177,854 A * 12/1979 DeVore ..... 160/207
4,429,491 A * 2/1984 Bruns ..... 49/340
4,609,027 A * 9/1986 Keller ..... E05D 15/264 160/207
5,020,580 A 6/1991 Dalman ..... E05F 15/51 160/188
5,882,099 A * 3/1999 Salice ..... 312/328
(Continued)

FOREIGN PATENT DOCUMENTS

GB 2150965 A 7/1985

*Primary Examiner* — William V Gilbert
(74) *Attorney, Agent, or Firm* — Smith Tempel Blaha LLC; Matthew T. Hoots

(57) ABSTRACT

The present invention is a door assembly including a rectangular door frame, a bi-fold door pivotally mounted at the top of the rectangular door frame and at least one hydraulic cylinder assembly. The hydraulic cylinder assembly is pivotally secured by a first end to a cylinder support mounted on a back side of the door frame, and by a second lower end to a cylinder support secured to a back surface of a top panel of the bi-fold door. In the door closed position, the longitudinal axis of the cylinder is oriented at an acute angle away from a plane defined by the door pivot axis and the lower pivot axis of the cylinder. A hydraulic control assembly controls movement of the door between an open and closed position.

12 Claims, 12 Drawing Sheets

(56) References Cited

U.S. PATENT DOCUMENTS

| | | | | |
|---|---|---|---|---|
| 6,068,327 | A * | 5/2000 | Junginger | 296/146.13 |
| 6,199,617 | B1 | 3/2001 | Schweiss | |
| 6,866,080 | B2 | 3/2005 | Schweiss | |
| 6,883,273 | B2 * | 4/2005 | Kerkvliet | 49/199 |
| 7,029,041 | B2 * | 4/2006 | Keller | E05F 15/686 292/201 |
| 7,168,477 | B2 * | 1/2007 | Salice | 160/213 |
| 7,814,957 | B2 * | 10/2010 | Crown | 160/207 |
| 2005/0199355 | A1 * | 9/2005 | Keller | E05F 15/51 160/213 |
| 2010/0287727 | A1 | 11/2010 | Suderman | |
| 2011/0232196 | A1 | 9/2011 | Robinson | E06B 3/38 49/358 |
| 2013/0008917 | A1 * | 1/2013 | Huang | E05D 15/262 49/358 |

* cited by examiner

OUTSIDE LOOKING IN "CLOSED"

OUTSIDE LOOKING IN "OPEN"

INSIDE LOOKING OUT "CLOSED"

INSIDE LOOKING OUT "OPEN"

HYDRAULIC LEVERAGED OVERHEAD DOOR ASSEMBLY

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

FIELD OF THE INVENTION

The present invention relates to a hydraulically operated overhead bi-fold door for use with residential, retail, commercial or industrial structures.

BACKGROUND THE INVENTION

Many buildings require large access openings to permit the ingress and egress of large equipment, merchandise or flow of people into and front the structure. Covering these large openings requires large doors. Different types of doors have been developed to cover such openings, such as top or bottom slidably mounted doors supported by a roller/track system, vertically pivotally mounted doors or top pivotally mounted (overhead) doors. Various means exist for opening and closing these doors, including man power, cables or hydraulics.

If a door opening is proportionately large with respect to the building size and there is limited available lateral space front the sides of the door opening or limited space in front of the door opening, many of these doors become impractical. Specifically, vertically pivotally mounted doors for large openings have a large arc of rotation and require significant forward or lateral space front the door opening when the doors are in the open position. Top slidably mounted doors require significant lateral extension of the horizontal support track(s) from the door opening to support the door when moved to an open position. Further, vertically pivotally mounted and top slidably mounted doors may interfere with other building operations or attributes. For example, an opaque vertically pivotally mounted or top slidably mounted door in an open position may extend in front of building viewing windows next to the door opening, blocking the view. Although transparent glass doors could be utilized, glass is quite heavy, historically requiring significant structural support for the door.

Top pivotally mounted, single panel doors are preferred, almost required, where lateral space is limited or nonexistent. However, these doors still require significant space in front of the door opening to be opened. Further, these doors are susceptible to wind damage because they typically present a large impervious surface when extended in the open position, and can be damaged in strong winds.

Top pivotally mounted single panel doors also require significant structural support because they are heavy and leveraged out front of a building. Historically, the materials used on a top pivotally mounted single panel door panels are typically of light weight to address structural support issues. Transparent glass panels for such doors are historically impractical because of the enhanced weight of glass and structural support requirements.

A great deal of force is typically required to open and close top pivotally mounted single or bi-fold panel doors because of the door weight and structural support required for these doors. To aid in the opening and closing of these doors, hydraulic cylinders have been employed.

By way of example, U.S. Pat. No. 6,883,273 to Kerkvliet discloses a top mounted single panel door pivotally secured by an upper edge to a header of a building door opening so that the door can be rotated outward from the building to an open position. The door is opened and closed by a pair of hydraulic cylinders. A first end of each hydraulic cylinder is pivotally secured to a building door jamb or frame and a second end of each hydraulic cylinder is pivotally secured at a side edge of the door, about half way down the side of the door. The action of the cylinders puts significant stress on the building frame where the cylinder is mounted.

Another example of a single panel hydraulically operated door is shown in Publication No. U.S. 2011/0232196 to Robinson. This patent application discloses a number of support trusses secured to the inside of the single panel door in spaced relation along the width of the door. The trusses extend from the top to the bottom of the door. The trusses are required to give the single panel door stability and strength and prevent it from bending under its own weight or from being damaged in high wind conditions. However, adding the trusses adds weight to the door, requiring greater structural support to hold the door open. Although hydraulic cylinders are used to open and close the door, because of the mounting orientation of the hydraulic cylinders and the size of the door, Robinson requires very long and powerful hydraulic cylinders to open and close the door.

A version of a hydraulically operated top pivotally mounted/overhead door that has reduced susceptibility to wind damage and reduced extension from the building is a bi-fold door. One such hydraulically operated bi-fold door is disclosed in Applicant's U.S. Pat. No. 7,814.957. Two hydraulic cylinders mounted on opposite sides of the door frame are used to open and close the overhead door. A first end of each hydraulic cylinder is pivotally mounted to the building door frame (the "building mount"), interior from and below the axis of rotation defined by the mounting hinges securing the upper panel of the door to the building door frame. A second end of each cylinder is attached to a side edge of the upper panel. In a door closed position, the hydraulic cylinders extend downward and forward from the building mount to a position close to the bottom of the top pane of the bi-fold door.

U.S. Pat. No. 5,020,580 to Dalman discloses a hydraulically actuated bi-fold door with the hydraulic cylinder and structural support mounted on the outside of the door to help reduce the force required to open (lift) the door. This exposes all the hydraulics to the elements. It also requires an extremely long hydraulic. The force imparted by the hydraulic cylinders when opening the door is communicated to the ground and not to the building. The door also includes a leveling mechanism that causes the lower bi-fold panel to fold horizontally and adjacent to the upper panel when the door is in its opened position. However, the upper panel of Dalman, in the open door position, is angled back towards the building structure. In a rainfall, the water is directed back towards the building, which is a detraction.

UK Patent Application GB 2150965A to Hindley discloses an overhead bi-fold door that is opened or closed with hydraulic cylinders. Both the external mount system of FIG. 1 and the internal mount system of FIG. 4 disclose the hydraulic cylinder positioned above the axis of rotation of the upper panel of the bi-fold door which requires significant addition vertical building space in the structure to house the cylinders. The cylinders must be long to effectuate opening and closing of the door. Further, the exterior mount version of the door shown in FIG. 1 has the same failing as Dalman—the upper panel of the door directs rain into the building when the door is in the open position.

There remains a need for an easily installed hydraulic operated door system that requires no space lateral of the door opening and limited space in front of the door opening for the door to open, that absorbs many of the load forces created from opening and closing the door within the door system, and that requires smaller, less expensive hydraulic cylinders to open and close a door even with heavy, non-traditional door panels, such as panels composed of glass.

BRIEF SUMMARY OF THE INVENTION

The present invention is a hydraulic operated top pivotally mounted overhead door assembly for a doorway defined in an interior or exterior rough opening. The hydraulic operated door assembly includes a three sided mounting frame, a multi-panel door and at least one hydraulic cylinder assembly for moving the door between an open and closed position. The entire assembly is mounted within a rough opening of a building doorway.

The mounting frame includes a top horizontal frame member and first and second vertical members secured on opposite ends of the upper horizontal frame member. Tracks are formed in the first and second vertical frame members to guide movement of a lower panel of the door as the door is opened and closed. Mounted on opposite sides and near the top of a back side of the mounting frame are one or more hydraulic cylinder supports for receiving a first, upper end of a hydraulic cylinder assembly. (A cylinder assembly includes a cylinder and extendable/retractable piston of a type known in the industry.)

The multi-panel door has at least an upper and lower panel horizontally pivotally coupled together. A top edge of the upper panel of the door is horizontally pivotally secured to the top horizontal member of the mounting frame.

The upper and lower panels have a front (typically exterior facing) surface and a back (typically interior facing) surface. One or more cylinder supports are mounted on the back surface of the upper panel, generally near the middle of the upper panel, for pivotally receiving a second, lower end of a hydraulic cylinder assembly.

Along the sides of a bottom edge of the lower panel are laterally extending rollers capable of traveling in the tracks formed in the first and second vertical frame members to guide movement of the lower panel as the door is opened and closed.

The door is opened and closed by a hydraulic, control system.

In one preferred embodiment, the overhead door includes two hydraulic cylinder assemblies positioned on opposite sides of the door. Each hydraulic cylinder assembly is pivotally mounted at a first end to a vertical frame member cylinder support and at a second, opposite end to the upper panel hydraulic cylinder supports.

A hydraulic manifold is in fluid communication with the hydraulic cylinder assemblies to move the piston between a retracted position and an extended position. When the pistons are in the retracted position, the door is in a closed position and when the pistons are in the extended position, the door is in an open position.

In the door closed position, due to the rearward extension of the hydraulic cylinder support from the back side of the upper panel, the hydraulic cylinder assemblies are oriented inward at an acute angle away from the vertical frame members. In the open door position, the hydraulic cylinder assemblies extend generally horizontally outward from the door opening.

Because one end of each cylinder is pivotally secured to and in spaced relation from the door panel by the cylinder supports when the door is in the closed position, the cylinders are relatively short compared to cylinders typical found in the prior art. Further, the mechanical advantage provided by the orientation of the hydraulic cylinder assemblies permits the doors to be opened with greater ease and to support greater weight. This allows the doors to be made of heavier material, such as glass. Glass doors are particularly attractive in store front or interior strip mall settings, where space in front of a door is limited, lateral space does not exist because of adjoining shops and viewing of merchandise behind the door is desired.

The self-framed door system is easy to install in a rough opening. Because the hydraulic cylinder assemblies are secured to the door frame and not the building, the load forces created from opening and closing the door are better distributed throughout the door frame, resulting in less wear and tear on the building.

The above summary of the invention is not intended to describe each and every embodiment of the invention. The Figures in the detailed description that follow more particularly exemplify these embodiments.

BRIEF DESCRIPTION OF THE DRAWINGS

The invention will be better understood when consideration is given to the following detailed description thereof. Such description makes reference to the annexed drawings wherein.

DESCRIPTION OF EXAMPLE EMBODIMENTS

Although the present disclosure is described in connection with exemplary embodiments, the present disclosure is not intended to be limited to the specific forms set forth herein. Other embodiments not disclosed or directly discussed are also considered to be within the scope and spirit of the invention. It is understood that various omissions and substitutions of equivalents are contemplated as circumstances may suggest or render expedient, but these are intended to cover the application or implementation without departing from the spirit or scope of the claims of the present disclosure. Also, it is to be understood that the phraseology and terminology used herein is for the purpose of description and should not be regarded as limiting.

The terms "first," "second," and the like, herein do not denote any order, quantity, or importance, but rather are used to distinguish one element from another, and the terms "a" and "an" herein do not denote a limitation of quantity, but rather denote the presence of at least one of the referenced item.

Figure 1:
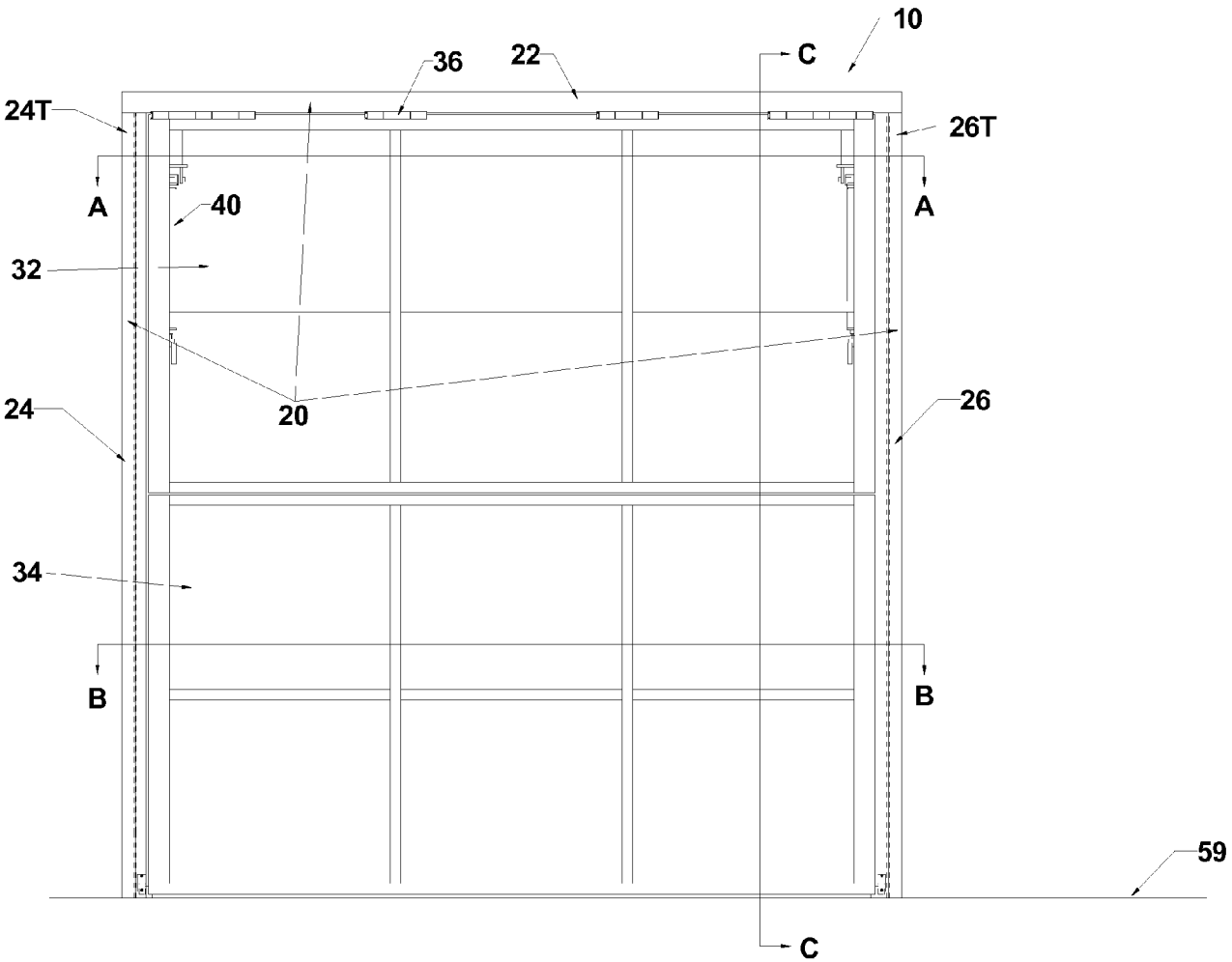
FIG. 1 is a front view of one preferred embodiment of the door assembly of the present invention.
Figure 1A:
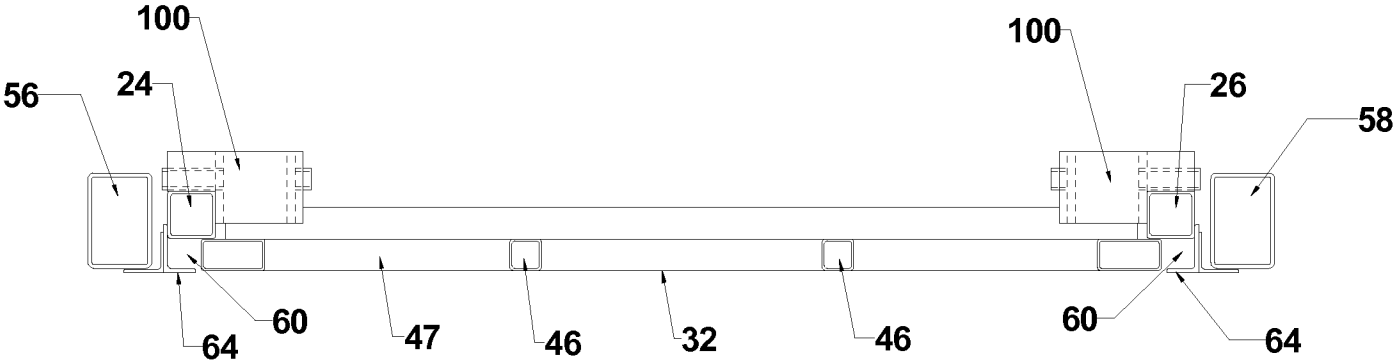
FIG. 1A is a view of FIG. 1 taken along line A-A.

The present invention, as shown at 10 in FIG. 1, is a hydraulic operated top pivotally mounted (overhead) door assembly for an external or internal building doorway and has application for residential, commercial, industrial or industrial structures. In one preferred embodiment, the hydraulic operated door assembly includes a three-sided mounting frame 20, a multi-panel door 30 and at least one hydraulic cylinder assembly 40 (which is the combination of a hydraulic cylinder and piston of a type well known in the art) for moving the door 30 between an open and closed position. The door entire assembly 10 is mounted within the rough opening of a building.

For exemplary purposes only, and not by way of limitation, the door assembly 10 will be described using a bi-fold door (the "door") and two hydraulic cylinder assemblies, even though multiple door panels and any number of hydraulic cylinder assemblies are anticipated with the present invention. Further, other components and features, such as alarms, sensors, windows and doors-within-a-door can also be used with the invention and should be considered to be within the spirit and scope of the invention.

Figure 2:
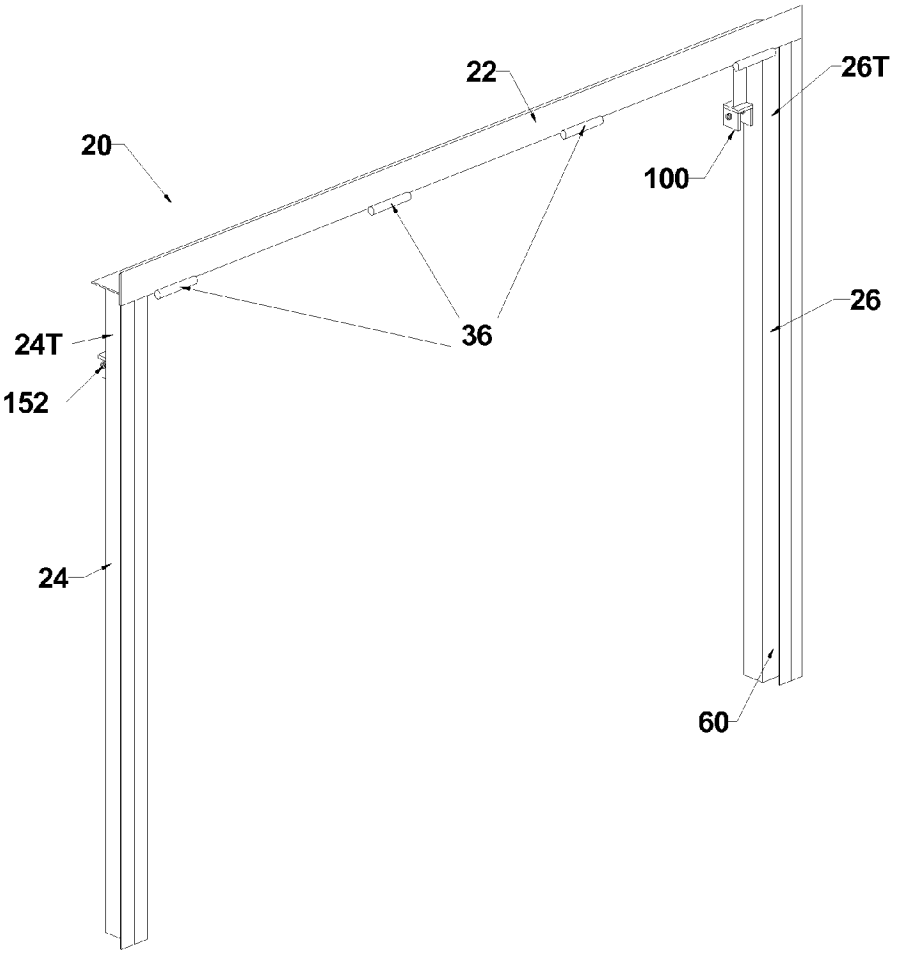
FIG. 2 is a perspective view of one preferred embodiment of a mounting frame of the present invention.

Referring to FIG. 2, the mounting frame 20 includes a top horizontal frame member 22 and first and second vertical frame members 24 and 26. A top end 24T of first vertical frame member 24 is secured at one end of the top horizontal frame member 22 and a top end 26T of second vertical frame member 26 is secured to an opposite end of the top horizontal frame member 22.

Figure 3:
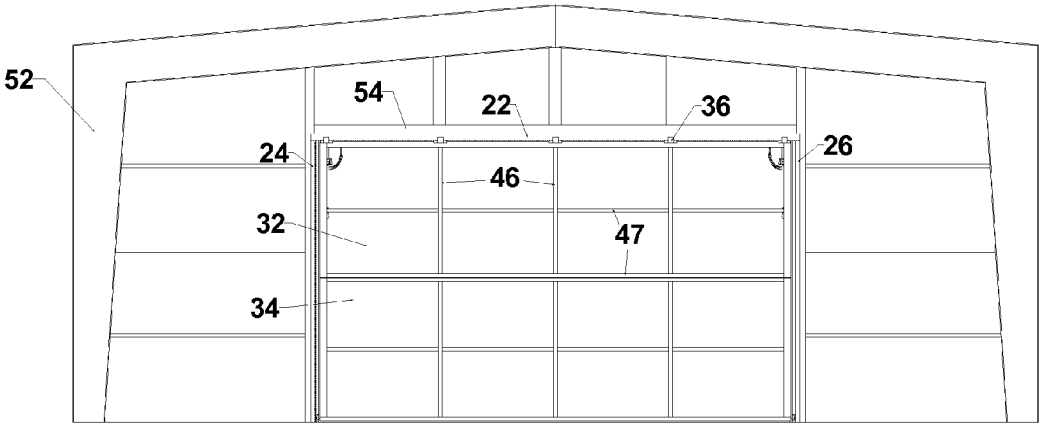
FIG. 3 is a front view of a second preferred (larger) embodiment of the door assembly of the present invention mounted in a building doorway with the door in an closed position.
Figure 3A:
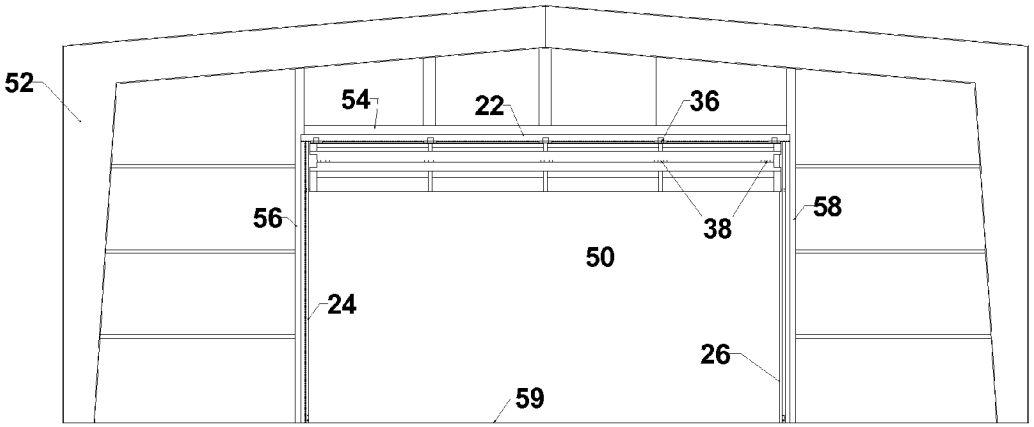
FIG. 3A is a front view of a second preferred (larger) embodiment of the door assembly of the present invention mounted in a building doorway with the door in a open position.

When installed in a rough opening 50 (FIG. 3A) of a building or structure 52, as shown in FIG. 3, the top horizontal frame member 22 is secured to a header 54 of a building rough opening the first and second vertical frame members 24 and 26 are secured to rough opening side jambs 56 and 58, respectively. An optional bottom horizontal member may be secured to a floor 59 of the building 52.

One skilled in the art will understand that the frame or door support 20 can be secured to the structure or ground by numerous techniques and devices such that those suggested herein would not be considered limiting. One skilled in the art will also appreciate that the mounting frame or door support 20 can be made from any type of material including steel plating that is either welded together or coupled together with any type of fastener. The mounting frame or door support 20 can also be manufactured from other light, generally rigid, materials such as aluminum or other composite materials.

Roller guide tracks or channels 60 are formed in or installed on surfaces of the first and second vertical frame members 24 and 26, respectively, to receive rollers carried by the bi-fold door 30 to guide movement of the door as it is opened and closed as shown in FIG. 2. Positioned on opposite top corners of the back side of the mounting frame are hydraulic cylinder supports 100 for pivotally engaging one end of a hydraulic cylinder assembly.

Figure 4:
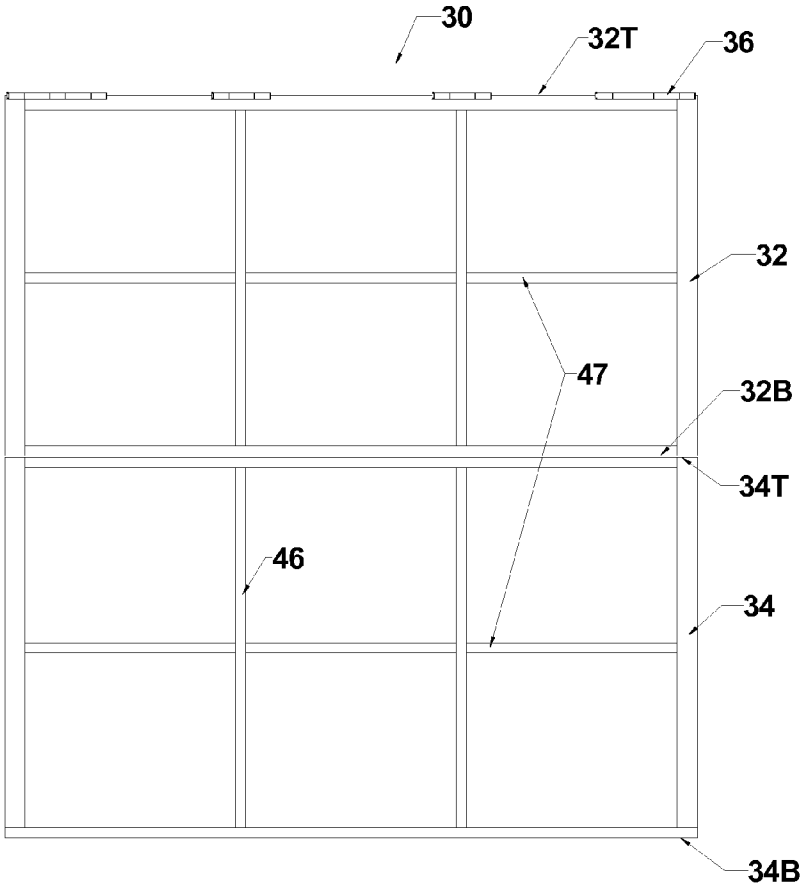
FIG. 4 is a front view of one preferred embodiment of the door of the present invention.
Figure 5:
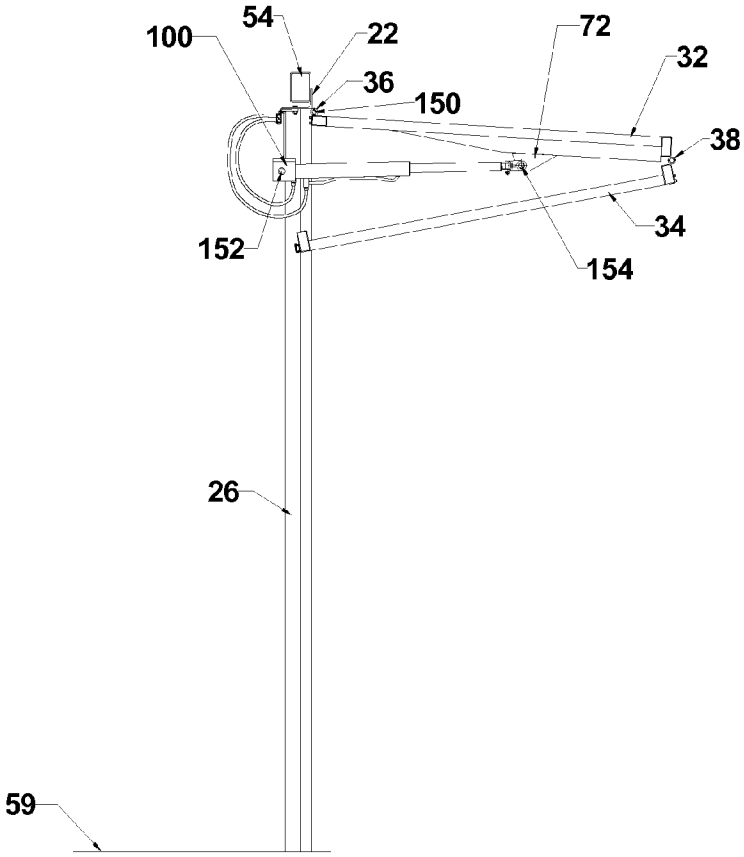
FIG. 5 is a side view of the door assembly of one preferred embodiment of the present invention with the door in its open position.

As shown in FIGS. 4 and 5, the bi-fold door 30 has a top or upper panel 32 and lower panel 34 horizontally pivotally coupled together. A top edge 32T of the upper panel 32 of the bi fold door 30 is horizontally pivotally secured to the top horizontal frame member 22 of the door frame 20. In one embodiment of the invention, barrel hinges 36 are used to pivotally connect the upper panel 32 to the horizontal frame member 22 of the mounting frame 20, although other types of hinges can be utilized to pivotally attach the upper panel 32 to the horizontal frame member 22. Hinges 36 can be spaced at desired intervals along the top edge 32T of the upper panel 32.

Similarly, a top edge 34T of lower panel 34 is pivotally secured to a lower or bottom edge 32B of the upper panel 32 by hinges 38. As with hinges 36, hinges 38 can be spaced at desired intervals along the top edge 34T of the lower panel 34. One skilled in the art will understand that the placement of the hinges 36 and 38 can be varied to maximize the strength and integrity of the bi-fold door 30 on the mounting frame 20.

Figure 1B:
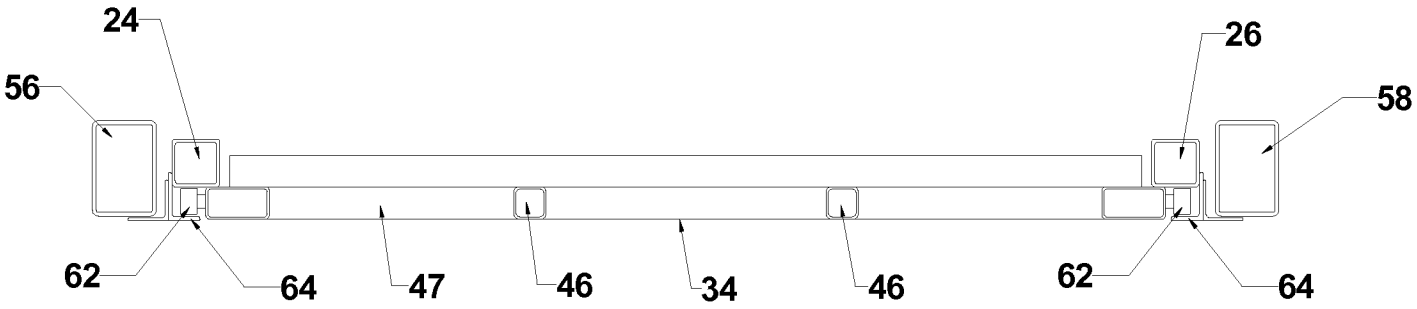
FIG. 1B is a view of FIG. 1 taken along line B-B.

As shown in FIG. 1B, the lower panel 34 includes at least one pair of rollers 62 disposed proximate a lower edge 34B of the lower panel 34 of the door 30, which extend laterally into operative engagement with roller guides or guide tracks 60 to guide movement of the lower panel as the door 30 is opened and closed. In one embodiment, the tracks 60 are formed by attaching an angled member 64 to the first and second vertical frame members 24 and 26. The angled member 64 should have a length at least equal to a height that the rollers are expected to travel along the track 60 when the door 30 moves between the closed position and opened positions.

In one embodiment, the upper panel 32 and the lower panel 34 have the same dimensions such as height and length. In other embodiments, the upper panel 32 and the lower panel 34 have different dimensions such as different heights. In other embodiments, additional panels can be added as part of door 30.

As shown in FIG. 4, the bi-fold door panels are comprised of a frame having a plurality of generally vertical door frame members 46 and a plurality of generally horizontal door frame members 47 that are connected by means known to one skilled in the art such as screws, bolts, and adhesives and/or welding. The vertical door frame members 46 and the horizontal door frame members 47 create a grid to which a skin is attached. The skin can comprise individual panels such as aluminum, steel, glass, wood, plastic and/or insulating material. This listing of materials should be considered an example listing and thus not limiting.

Figure 1C:
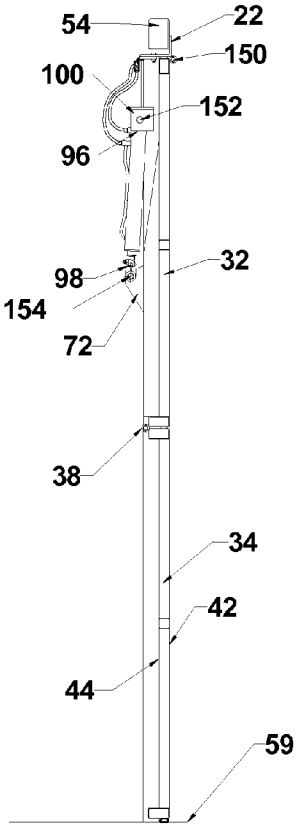
FIG. 1C is a view of FIG. 1 taken along line C-C.
Figure 2A:
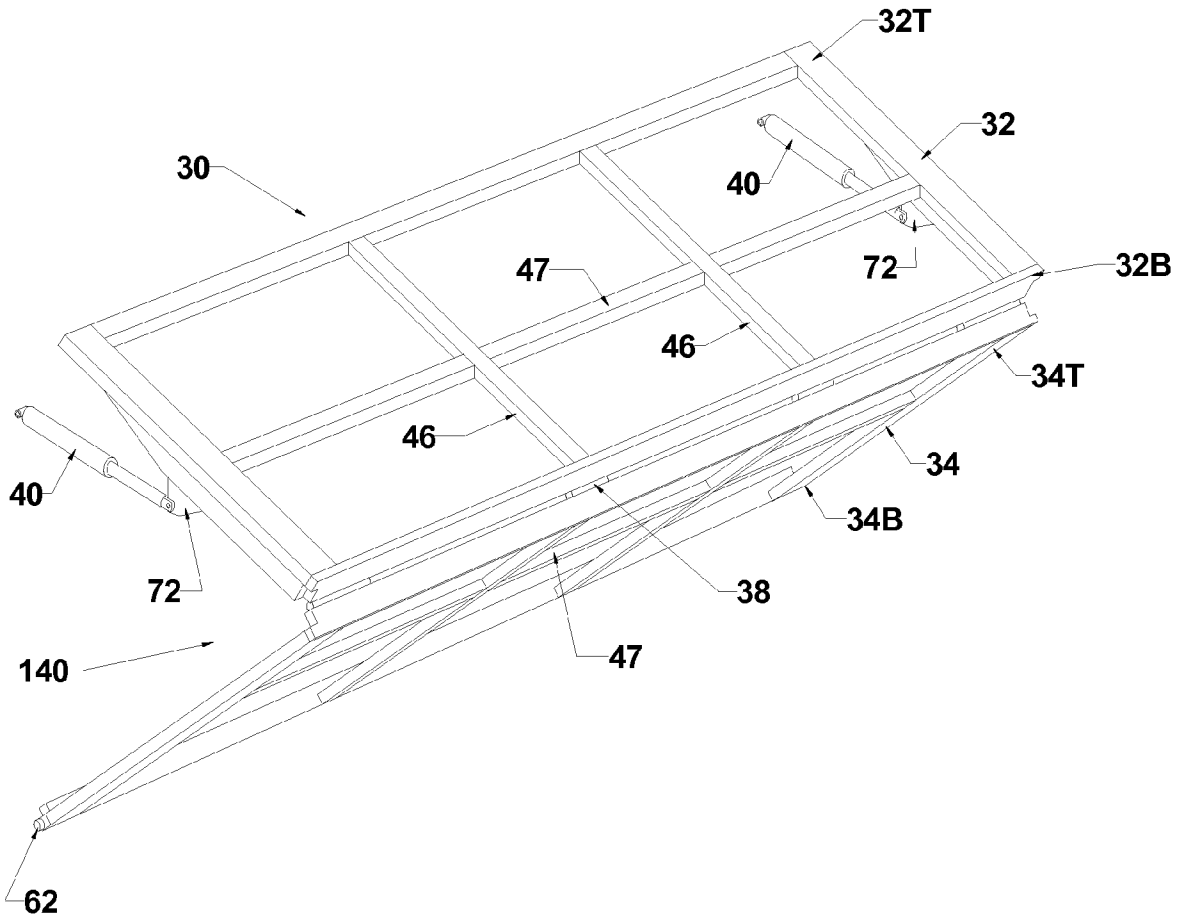
FIG. 2A is a perspective view of one preferred embodiment of a door of the present invention.
Figure 2B:
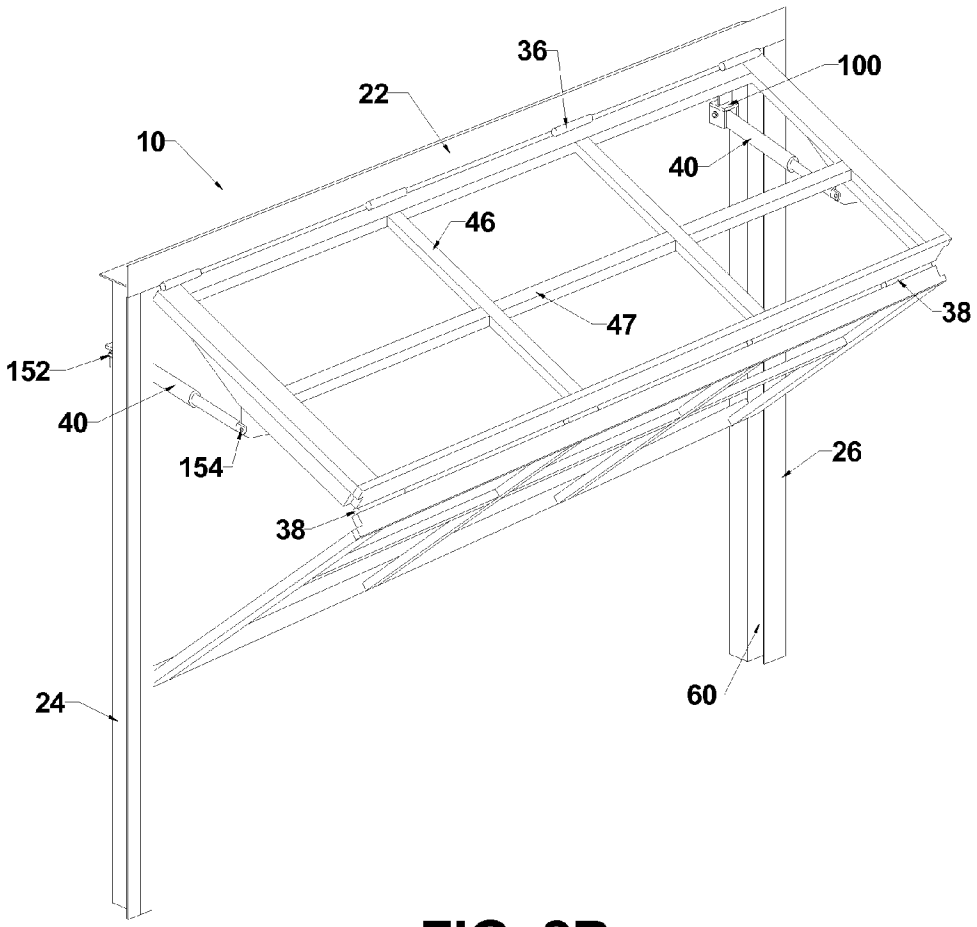
FIG. 2B is a perspective view of one preferred embodiment of a door and mounting frame of the present invention.

As shown in FIG. 1C, the top and bottom panels have a front (exterior facing) surface 42 and a back (interior facing) surface 44, Two cylinder supports 72 are mounted on opposite sides of the back (interior facing) surface 44 of the upper panel 32 (best viewed in FIG. 2A). The door hydraulic cylinder support 72 is generally located near the middle of a side edge of the upper panel 32 as shown in FIGS. 5 and 6, but may be adjusted to a location that provides the greatest mechanical advantage within the bounds of the present invention, Hydraulic cylinder support 72 is secured to the door 30 by known means, such as welding or fasteners such as screws or bolts.

The hydraulic cylinder support 72 can be solid or a skeletal frame extending from the back side of the upper panel 32 to position the cylinder mount in a preferred spaced relation with the upper panel 32. The cylinder support can he made of any material that can bear the stresses imposed on it by repeated opening and closing of the door 30.

Figure 7:
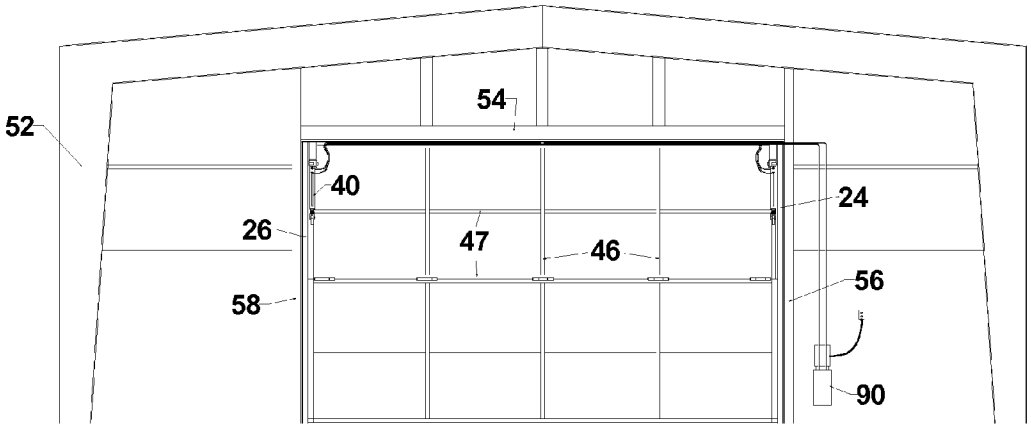
FIG. 7 is a rear (interior) view of a second preferred (larger) embodiment of a door assembly of the present invention, with the door in its dosed position, illustrating the orientation of the cylinder mounted between the vertical mounting frame members and the upper panel.
Figure 8:
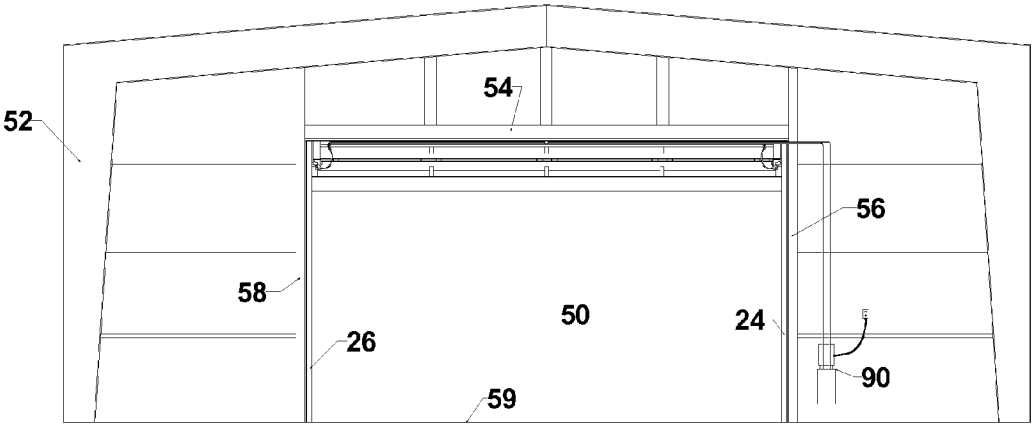
FIG. 8 is a rear (interior) view of a second preferred (larger) embodiment of a door assembly of the present invention with the door in its open position, illustrating the orientation of the cylinder mounted between the vertical mounting frame members and the upper panel.

The door is opened and closed by a hydraulic control system 90 (shown in FIGS. 7 and 8) known in the art that in one preferred embodiment includes two hydraulic cylinder assemblies 40. The two hydraulic cylinder assemblies 40 are, in one preferred embodiment, positioned on opposite sides of the door 30. Each hydraulic cylinder assembly 40 is pivotally mounted by a first end 96 to a frame hydraulic cylinder support 100 and is further pivotally mounted at a second end 98 to a door hydraulic cylinder support 72. The hydraulic cylinder supports are located roughly midpoint of the height of the upper panel, although other locations are possible. Although the door and frame hydraulic cylinder supports are described in one preferred embodiment as being located on opposite sides of the upper panel 32, for large doors, more hydraulic cylinder assemblies and supports may be required. These additional hydraulic cylinder assemblies and cylinder supports may be added at desired spacing along the width of the door 30.

When the pistons are in the retracted position, the door is moved to a closed position as shown in FIG. 1C; when the pistons are in the extended position, the door is moved to an open position, as shown in FIG. 5.

If power to the hydraulic control system fails, a system operator can manually actuate a control valve to slowly lower the door 30 from the open position toward the closed position. Additionally, in one embodiment, hydraulic control system 90 can be operated by a DC backup system. Other safety components and features are also possible and should be considered to be within the spirit and scope of the invention.

In use, the manifold can control the flow of fluid into the hydraulic cylinder assemblies 40. The fluid forces a piston rod to move from the retracted position toward the extended position. As the piston rod moves toward the extended position, a central portion of the bi-fold door 30, where the upper panel 32 and the lower panel 34 are pivotally coupled together, moves outwardly away from the rough opening 50. As the piston rod continues toward its extended position, the upper panel 32 is lifted upwardly causing the rollers 62 connected to the lower panel 34 to travel upward in channels 60.

When the piston rod reaches its permitted outermost extended position, the upper panel 32 and the lower panel 34 form a wedge with the opening 140 as shown at FIG. 2A.

Referring to FIG. 6, the pivot axis of the upper panel 32, where it is connected to the top horizontal frame member 22 (the "door pivot axis"), is shown at 150. The pivot axis of the first end 96 of hydraulic cylinder assembly 40 ("cylinder upper pivot axis") is shown at 152. This cylinder first end pivot axis is behind and lower than the door pivot axis 150. The pivot axis of the second end 98 of hydraulic cylinder assembly 40 (the "cylinder lower pivot axis") is shown at 154 and is below and behind the cylinder upper pivot axis 152 when door 20 is in its closed position.

Figure 6A:
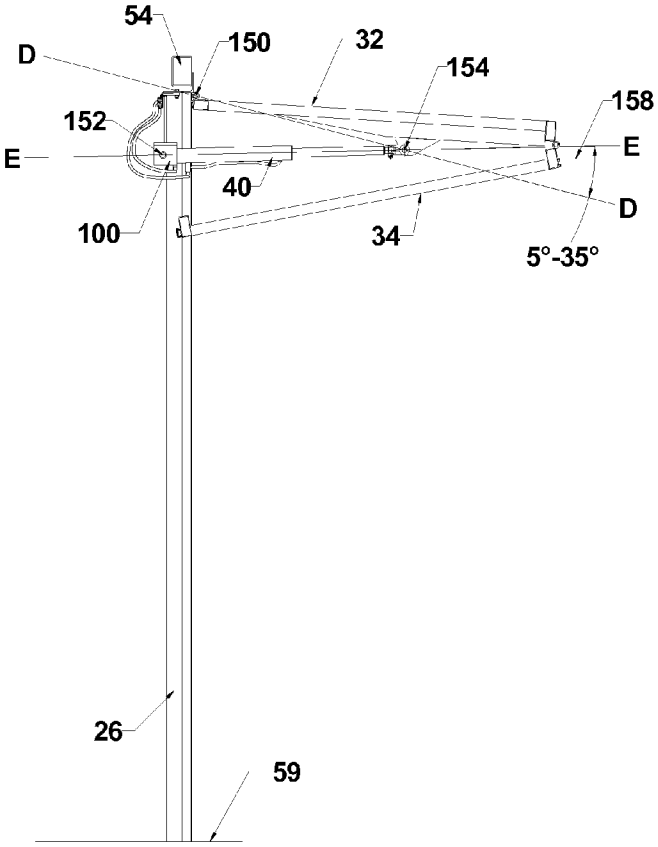
FIG. 6A is a side view of one preferred embodiment of the door assembly of the present invention with the door in its open position, showing one example of the dimensions and angular relationships of the door components.
Figure 6:
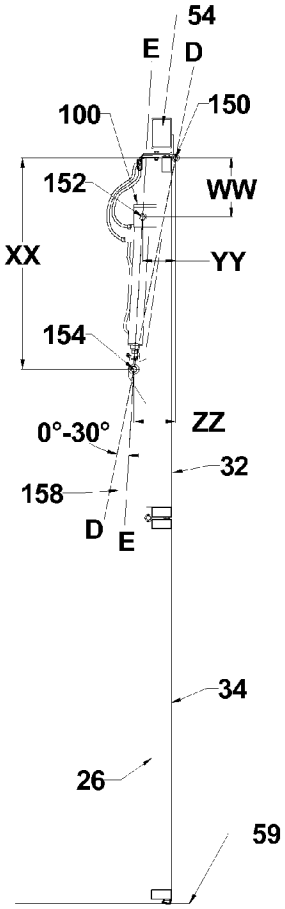
FIG. 6 is a side view of one preferred embodiment of the door assembly of the present invention with the door in its closed position, showing one example of the dimensions and angular relationships of the door components.

As shown in FIGS. 6 and 6A, the door pivot axis 150 and cylinder lower pivot axis 154 lie in a plane identified as D-D; the cylinder upper and lower pivot axes, 152 and 154 respectively, lie in a plane defined by the line E-E. The intersection of lines D-D and E-E form an acute angle 158 (the "cylinder angle of orientation").

As stated above, the pivot axis of the second end 98 of hydraulic cylinder assembly 40 is below and behind the cylinder upper pivot axis 152 when door 20 is in its closed position; thus, the hydraulic cylinder assembly is angled away from the back (interior facing) surface 44 of door 30 as measured from pivot axis 152. The force applied by the hydraulic cylinder assembly 40 to the hydraulic cylinder support 72 causes the upper panel 32 to rotate outward from the door frame 20 as the piston rod is extended from the cylinder. The cylinder angle of orientation 158 remains at an acute angle as the cylinder rotates with the opening of the door, as shown in FIGS. 6 and 6A.

By way of example, one preferred embodiment of the invention, as shown in FIG. 6, is a door sized to fit within a 12 foot six inch high rough opening, where the upper and lower panels have approximately the same dimension, The pivot axes angles and critical distances of this exemplary door are as follows:

WW, the vertical distance between the upper panel/frame pivot axis 150 and the cylinder upper pivot axis 152 is 12 inches;

YY, the horizontal distance between the upper panel pivot axis 150 and the cylinder upper pivot axis 152 is 6.5 inches;

XX, the vertical distance between the upper panel/frame pivot axis 150 and the cylinder lower pivot axis 154 is 43.5 inches; and ZZ, the horizontal distance between the upper panel/frame pivot axis 150 and the cylinder lower pivot axis 154 is 8.5 inches, In this embodiment, the cylinder angle of orientation, when the door is in its closed position, as shown in FIG. 6, can range from 0 to 30 degrees. The cylinder angle of orientation when the door is in its open position, as shown in FIG. 6A, can range from 5 to 35 degrees.

Although wider and narrower angles of orientation are anticipated by the present invention, in one preferred embodiment, the cylinder angle of orientation remains relatively small throughout the door opening process, starting at about 7.8 degrees when the door is in the closed position, to about a high of about 18 degrees as the door is partially open to 15.8 degrees when the door is in the fully open position.

The doors of the present invention can be constructed of larger or small size, if the component orientation is maintained as described above. This orientation can be maintained by spacing the cylinder lower pivot axis of rotation 154 sufficiently from the back (interior facing) surface 44 of the door 30 to orient the hydraulic cylinder assembly as described above. Of course, proportionately smaller and larger doors require proportionately small and larger cylinders to maintain the proper configuration of the door components.

In another preferred embodiment, the first end 96 of the hydraulic cylinder assembly 40 is attached over center of the cylinder support 72.

Other configurations of a door hydraulic cylinder support 72 are possible, by way of example, a triangular or rectangular truss extending along part or all of the upper panel height. However, if other configurations of the cylinder support are utilized, the cylinder may need to be attached to one side of the cylinder support to avoid operational interference.

This disclosed configuration of the cylinder support and orientation of the hydraulic cylinder assemblies facilitates use of a short hydraulic cylinder assembly with reduced rod extension to open and close the door. The cylinder support further provides strength to the door. Further, the mechanical advantage provided by the orientation of the hydraulic cylinder assemblies permits the doors to be opened with greater ease and to support greater weight. This allows the doors to be made of heavier material, such as glass. Glass doors are particularly attractive in store front or interior strip mall settings, where space in front of a door is limited, lateral space does not exist because of adjoining shops and viewing of merchandise behind the door is desired.

As shown in FIG. 6A, in the door open position, the hydraulic cylinder assemblies 40 extend generally horizontally outward from the door opening.

Because the hydraulic cylinder assemblies are secured to the mounting frame and not the building, the load forces created from opening and closing the door are better distributed throughout the mounting frame, resulting in less wear and tear on the building structure. Additionally, the self-framed door system is easy to install in a rough opening.

The invention may be embodied in these and other specific forms without departing from the spirit or attributes thereof, and it is therefore desired that the embodiments be considered in all respects as illustrative and not restrictive, reference being made to the appended claims rather than to the foregoing description to indicate the scope of the invention.

The invention claimed is:

1. A multi-panel door and frame assembly for a rough opening in a building, comprising:

a mounting frame assembly having a front *side* and *a* back side, the mounting frame assembly being mountable within [a] *the* rough opening of [a] *the* building, the mounting frame including a horizontal frame member, a first vertical frame member secured by a top end to a first end of the horizontal frame member, a second vertical frame member secured by a top end to a second end of the horizontal frame member, and [at least one] *a* linearly extendable actuator upper support bracket secured to the back side of the mounting frame assembly[, for pivotally engaging an upper end of a linearly extendable actuator for rotation about a linearly extendable actuator upper pivot axis] *and extending down relative to the horizontal frame member to provide a linearly extendable actuator upper pivot axis that is beneath the horizontal frame member and adjacent to one of the first vertical frame member and the second vertical frame member*;

a door including an upper panel and [at] *a* lower panel, the upper panel having a back *surface* and *a* front surface, wherein the upper panel is pivotally secured by a top edge to the [mounting frame] horizontal *frame* member for rotation about an upper panel pivot axis, and wherein the upper panel is pivotally secured by a bottom edge to a top edge of the lower panel, *and wherein the back surface of the upper panel is associated with the back side of the mounting frame assembly*;

[at least one] *a* linearly extendable actuator lower support bracket secured to and extending [rearward] *away* from [a] *the* back surface of the upper panel [for pivotally engaging a lower end of a linearly extendable actuator for rotation about] *to provide* a linearly extendable actuator lower pivot axis;

[at least one] *a* linearly extendable actuator having an upper *end* and *a* lower end, pivotally mounted by its upper end to the linearly extendable actuator upper support bracket and pivotally secured by its lower end to the linearly extendable actuator lower support bracket, *wherein the linearly extendable actuator upper support bracket is configured to pivotally engage the upper end of the linearly extendable actuator for rotation about the linearly extendable actuator upper pivot axis and the linearly extendable actuator lower support bracket is configured to pivotally engage the lower end of the linearly extendable actuator for rotation about the linearly extendable actuator lower pivot axis*;

a linearly extendable actuator control assembly in communication with the linearly extendable actuator to control extension and retraction of the linearly extendable actuator to open and close the door; and wherein [the linearly extendable actuator upper pivot axis is located below and behind the upper panel pivot axis, and] the linearly extendable actuator lower pivot axis is located [below and behind the linearly extendable actuator upper pivot axis, when the door is in its closed position] *at a first distance away from a plane defined by the back surface of the upper panel, the linearly extendable actuator upper pivot axis is located at a second distance away from the plane defined by the back surface of the upper panel, and the first distance is greater than the second distance*.

[2. A bi-fold panel door and mounting frame assembly for a rough opening in a building, comprising:

a mounting frame assembly having a front and back side, the mounting frame being mountable within a rough opening, the mounting frame including a horizontal frame member and first and second vertical frame members secured to and extending downward from opposite ends of the horizontal frame member, at least one linearly extendable actuator upper support bracket secured to the back side of the mounting frame assembly for pivotally engaging an upper end of a linearly extendable actuator for rotation about a linearly extendable actuator upper pivot axis;

a bi-fold panel door having an upper panel and lower panel, the upper panel having a front and back surface, wherein the upper panel is pivotally secured at a top edge of the upper panel to the mounting frame assembly horizontal member, defining an upper panel pivot axis and wherein the upper panel is pivotally secured by a bottom edge to a top edge of the lower panel;

at least one linearly extendable actuator lower support bracket secured to and extending rearward from a back surface of the upper panel for pivotally engaging a lower end of a linearly extendable actuator for a rotation about a linearly extendable actuator lower pivot axis;

at least one linearly extendable actuator having an upper and lower end, pivotally mounted by its upper end to the linearly extendable actuator upper support bracket and pivotally secured by its lower end to the linearly extendable actuator lower support bracket; and a linearly extendable actuator control assembly in communication with the linearly extendable actuator to control extension and retraction of the actuator to open and close the bi-fold panel door;

wherein the linearly extendable actuator upper pivot axis is located below and behind the upper panel pivot axis, and the linearly extendable actuator lower pivot axis is located below and behind the linearly extendable actuator upper pivot axis, when the door is in its closed position.]

[3. The bi-fold panel and mounting frame assembly of claim 2 wherein two linearly extendable actuator upper support brackets are secured to opposite sides of the mounting frame assembly, two linearly extendable actuator lower support brackets secured to opposite sides of the upper panel, and two linearly extendable actuators are each secured to a corresponding pair of linearly extendable actuator upper and lower support brackets. ]

4. The [bi-fold panel] *multi-panel door* and [mounting] frame assembly of claim [2] *1,* wherein [the] *said* linearly extendable actuator upper support bracket is secured on [or adjacent to a corresponding] *the* vertical frame member *to which it is adjacent.*

5. The [bi-fold panel] *multi-panel door* and [mounting] frame assembly of claim [2] *1,* wherein the upper panel has a width and a height and [the] *said* linearly extendable actuator lower [support bracket] *pivot axis* is located *in a position corresponding to* approximately mid-height of the upper panel.

[6. The bi-fold panel and mounting frame assembly of claim 2 wherein the upper panel pivot axis and linearly extendable actuator lower pivot axis form a plane and the linearly extendable actuator upper and lower pivot axes form a plane and wherein the angle of intersection of these planes remains at an acute angle as the door is moved between an open and closed position.]

7. The [bi-fold panel] *multi-panel door* and [mounting] frame assembly of claim [2] *1,* wherein the upper panel pivot axis and linearly extendable actuator lower pivot axis form a plane and the linearly extendable actuator upper and lower pivot axes form a plane and wherein the angle of intersection of these planes [remains at] *is* an acute angle [as the door is moved between an open and closed position and wherein the acute angle formed by these planes is approximately 0 to 30 degrees when the door is in its closed position and is approximately 5 to 35 degrees when the door is in its open position] *within a range of 0 to 13 degrees when the door is in a closed position and is an acute angle within a range of 12 to 25 degrees when the door is in an open position.*

8. The [bi-fold panel] *multi-panel* door and [mounting] frame assembly of claim [2] *1,* wherein the upper and lower panels have identical heights.

9. The [bi-fold panel] *multi-panel* door and [mounting] frame assembly of claim [2] *1,* wherein the upper and lower panels have different heights.

10. The [bi-fold panel] *multi-panel* door and [mounting] frame assembly of claim [2] *1*, wherein the linearly extendable actuator is a hydraulic cylinder assembly.

11. The [bi-fold panel] *multi-panel* door and frame assembly of claim [2] *10*, wherein the hydraulic cylinder *assembly* includes a cylinder and piston rod and further [including] *includes* a stop for limiting [the] extension of the piston from the cylinder.

12. A bi-fold panel door and mounting frame assembly for a rough opening in a building, comprising:

a mounting frame assembly having a front *surface* and *a* back surface, mountable within a rough opening, the mounting frame assembly including a horizontal frame member and first and second vertical frame members secured to and extending downward from opposite ends of the horizontal frame member, and two hydraulic cylinder assembly upper support brackets, *wherein each of the hydraulic cylinder assembly upper support brackets are* secured [on opposite sides of] *to* the back surface of the mounting frame assembly *adjacent to the first and second vertical frame members, respectively, and each extends down relative to the horizontal frame member to provide a hydraulic cylinder assembly upper pivot axis that is beneath the horizontal frame member, and wherein the two hydraulic cylinder assembly upper support brackets are each configured* for pivotally engaging an upper end of a hydraulic cylinder assembly for rotation about a hydraulic cylinder assembly upper pivot axis;

a bi-fold door having an upper panel pivotally secured to a bottom panel, each *of the upper panel and bottom* panel having a front and back surface, the upper panel being pivotally secured at a top edge of the upper panel to the mounting frame horizontal *frame* member for rotation about an upper panel pivot axis, *and wherein the back surface of the upper panel is associated with the back surface of the mounting frame assembly*;

two hydraulic cylinder assembly lower support brackets secured to [an] *and* extending [rearward] *away* from the upper panel back surface [on opposite sides], *each configured* for pivotally engaging a lower end of a hydraulic cylinder assembly for rotation about a hydraulic cylinder assembly lower pivot axis;

two hydraulic cylinder assemblies having extendable and retracting piston rods and an upper and lower end, each pivotally mounted by their respective upper ends to a hydraulic cylinder assembly upper support bracket and pivotally secured by their respective lower ends to a corresponding hydraulic cylinder assembly lower support bracket; and a hydraulic control assembly is fluid communication with the *two* hydraulic cylinder [assembly] *assemblies* to control extension and retraction of the hydraulic cylinder assembly piston [rod] *rods* to move the door between [an] open and [a] closed [position] *positions*;

wherein the upper panel pivot axis and hydraulic cylinder assembly lower pivot axis form a plane and the hydraulic cylinder assembly upper and lower pivot axes form a plane and wherein the angle of intersection of these planes [remains] *is* an acute angle [as the door is moved between an open and closed position] *within a range of 0 to 13 degrees when the door is in a closed position and is an acute angle within a range of 12 to 25 degrees when the door is in an open position.*

[13. The bi-fold panel door and mounting frame assembly of claim 12 wherein the acute angle formed by the planes fall in a range of 0 to 30 degrees when the door is in its closed position.]

[14. The bi-fold panel door and mounting frame assembly of claim 12 wherein the acute angle formed by the planes falls in a range of 5 to 35 degrees when the door is in its open position.]

*15. The bi-fold panel door and mounting frame assembly of claim 12, wherein the angle of intersection is an acute angle of about 18 degrees when the door is in a partially open position.*

*16. A bi-fold panel door and mounting frame assembly for a rough opening in a building, comprising:*

*a frame defining an opening, wherein the frame has a front and back surface, includes a horizontal frame member and first and second vertical frame members*

*secured to and extending downward from opposite ends of the horizontal frame member, and is mountable within a rough opening;*

*a bi-fold panel door having an upper panel and a lower panel, wherein:*

*an upper end of the upper panel is pivotally connected to said horizontal frame member at an upper panel pivot axis;*

*a lower end of the upper panel is pivotally connected to an upper end of the lower panel; and*

*the lower panel comprises one or more rollers extending laterally away from the lower panel into operative engagement with one or more complementary roller guides associated with the frame;*

*a hydraulic cylinder assembly comprising a cylinder and a piston rod, wherein an upper connection point associated with the cylinder is pivotally connected to a first bracket that defines a first pivot point positioned inside the frame-defined opening and beneath the horizontal frame member, and a lower connection point associated with the piston rod is pivotally connected to a second bracket that defines a second pivot point, the second bracket being mounted to the upper panel;*

*a hydraulic control assembly in fluid communication with the hydraulic cylinder assembly to control extension and retraction of the hydraulic cylinder assembly piston rod to move the door between an open and a closed position;*

*wherein first bracket is secured on or adjacent to the first vertical frame member; and*

*wherein an angle defined by the piston rod and a plane defined by the upper panel pivot axis and the said second pivot point is an acute angle within a range of 0 to 13 degrees when the door is in a closed position and is an acute angle within a range of 12 to 25 degrees when the door is in an open position.*

*17. A bi-fold panel door and mounting frame assembly for a rough opening in a building, comprising:*

*a frame defining an opening, wherein the frame has a front and back surface, includes a horizontal frame member and first and second vertical frame members secured to and extending downward from opposite ends of the horizontal frame member, and is mountable within a rough opening;*

*a bi-fold panel door having an upper panel and a lower panel, wherein:*

*a lower end of the upper panel is pivotally connected to an upper end of the lower panel; and*

*the lower panel comprises one or more rollers extending laterally away from the lower panel into operative engagement with one or more complementary roller guides associated with the frame;*

*a hydraulic cylinder assembly comprising a cylinder and a piston rod, wherein an upper connection point associated with the cylinder is pivotally connected to a first bracket that defines a first pivot point positioned inside the frame-defined opening and beneath the horizontal frame member, and a lower connection point associated with the piston rod is pivotally connected to a second bracket that defines a second pivot point, the second bracket being mounted to the upper panel;*

*a hydraulic control assembly in fluid communication with the hydraulic cylinder assembly to control extension and retraction of the hydraulic cylinder assembly piston rod to move the door between an open and a closed position;*

*wherein the first bracket is secured on or adjacent to the first vertical frame member; and*

*wherein an angle defined by the piston rod and a plane defined by the upper panel pivot axis and the said second pivot point is an acute angle of about 7.8 degrees when the door is in a closed position and is an acute angle of about 15.8 degrees when the door is in an open position.*

* * * * *